United States Patent [19]

Parshall

[11] 3,972,133

[45] Aug. 3, 1976

[54] MAHL-STICK HOLDER

[76] Inventor: Raymond H. Parshall, 1011 El Sur Way, Sacramento, Calif. 95825

[22] Filed: June 25, 1975

[21] Appl. No.: 590,300

[52] U.S. Cl. .................................. 35/26; 248/441 R

[51] Int. Cl.² ........................................... G09B 11/02

[58] Field of Search ................... 33/76 R; 35/26, 38; 40/357; 46/26; 115/24.1, 24.4; 206/1.7; 269/249; 273/23

[56] References Cited

UNITED STATES PATENTS

| | | | |
|---|---|---|---|
| 289,700 | 12/1883 | Parker | 35/26 UX |
| 518,761 | 4/1894 | Lloyd | 33/76 R |
| 1,185,178 | 5/1916 | Cella | 115/24.4 |
| 1,422,641 | 7/1922 | Walters | 33/76 R |
| 2,814,142 | 11/1957 | Warwick | 248/441 R |
| 3,101,568 | 8/1963 | Tratt | 248/441 R |
| 3,258,821 | 7/1966 | Curran | 269/249 X |

FOREIGN PATENTS OR APPLICATIONS

| | | | |
|---|---|---|---|
| 115,606 | 5/1918 | United Kingdom | 273/23 |

*Primary Examiner*—Harland S. Skogquist
*Attorney, Agent, or Firm*—Phillips, Moore, Weissenberger, Lempio & Strabala

[57] ABSTRACT

A device is disclosed for use in combination with an artist's frame-mounted working surface and a mahl-stick, which device provides support for one end of the mahl-stick in order to provide more stable support for the hand of the artist in use. A preferred embodiment in which the device may be removably affixed to an artist's frame and provides a plurality of mahl-stick supporting points is described. Structural details of the mahl-stick support are disclosed.

8 Claims, 4 Drawing Figures

MAHL-STICK HOLDER

BACKGROUND OF THE INVENTION

This invention relates to apparatus for drawing and painting and more particularly to a device for use in combination with an artist's frame-mounted working surface and a mahl-stick to provide a more stable support for the end of the mahl-stick in use.

A favored working medium of artists, sign painters, cartographers, delineators and the like is a canvas, cardboard, or working surface of other material mounted on a hollow rectangular frame. The frame is then supported with the working surface in a generally vertical plane by means of an easel or the like providing free and flexible access for the artist to all points on the working surface and orienting the work in the position in which it is to be viewed.

Heretofore, various complicated slides and supporting or shielding mechanisms and devices have been provide for the use of artists and the like in producing a work on a working surface oriented in a generally horizontal plane. U.S. Pat. Nos. 632,821 to Mitchell; 2,814,142 to Warwick; 2,815,600 to Caudle; and 3,101,568 to Tratt are representative of the prior art. The expense and complication of such devices is not only justified when the work surface is oriented horizontally in order to enable the artist to reach all areas of the work surface, but required, if smudging of the working surface by contacts of the hand of the artist is to be eliminated. However, such mechanisms and devices have the disadvantage of tending to limit the free expression of the artist by confining his hand movements to generally straight lines at right angles to the frame in the plane immediately adjacent the working surface.

Although orientation of the working surface in a generally vertical plane is favored for the reasons first given above and because it tends to allow greater freedom of movement of the artist's hand thereby removing all restriction from the artist's expression of his theme, it is often necessary to apply different colors contiguous to previously applied, but still wet, colors. This requires great steadiness of hand which, coupled with the fact that it is sometimes necessary to draw straight lines, long ago resulted in the use of a "mahl-stick" in combination with generally vertically oriented working surfaces.

In essence, a mahl-stick serves both as a guide and as a support for the artist's hand or arm adjacent the working surface. It is generally a round stick or rod, of a convenient length, that is held at one end in the free hand of the artist with its other end in contact with the canvas or frame. Thus, the mahl-stick can provide a "bridge" across previously applied wet paint or a "straight edge" against which the artist may rest his hand or arm for increased steadiness in his work.

However, the free end of the mahl-stick can slip along the frame or canvas and the support provided by the mahl-stick is shakey and leaves something to be desired.

It is an object of this invention to provide a device for use in combination with the mahl-stick and frame mounted vertical working surface which introduces greater steadiness into the system.

It is a further object of this invention to provide the above increased steadiness without limiting the freedom of motion and expression provided by the mahl-stick and frame mounted vertical working surface.

SUMMARY OF THE INVENTION

Briefly, according to this invention, a mahl-stick holder is provided for use in combination with a mahl-stick and an artist's frame comprising two elongated side members interconnected at their opposite ends by elongated top and bottom members into a hollow rectilinear configuration, such side, top and bottom members having identical cross-sections of given width and height dimensions, and with a canvas or other working surface mounted over the hollow rectilinear configuration. The mahl-stick holder comprises a U-shaped member having a bight slightly larger than the width dimension of the cross-section of the side, top and bottom members, one leg of the U-shaped member having a length less than the height dimensions of the side, top and bottom members, the other leg of the U-shaped member having a length substantially greater than the height dimension of the cross-section of the side, top and bottom members, which other leg member is provided with an aperture having cross-sectional dimensions larger than the cross-sectional dimensions of the mahl-stick and spaced from the bight of the U-shaped member by a distance greater than the height dimension of the cross-section of the side, top and bottom members, and means associated with the legs of the U-shaped member for removably clamping the U-shaped member to one of the side, top and bottom members of the frame with the one leg of the U-shaped member within the frame and the other leg of the U-shaped member projecting beyond the working surface on the outside of the frame.

BRIEF DESCRIPTION OF THE DRAWING

This invention will be more fully understood from a reading of the following detailed description of preferred embodiments thereof in conjunction with the attached drawing wherein.

DESCRIPTION OF PREFERRED EMBODIMENTS

Figure 1:
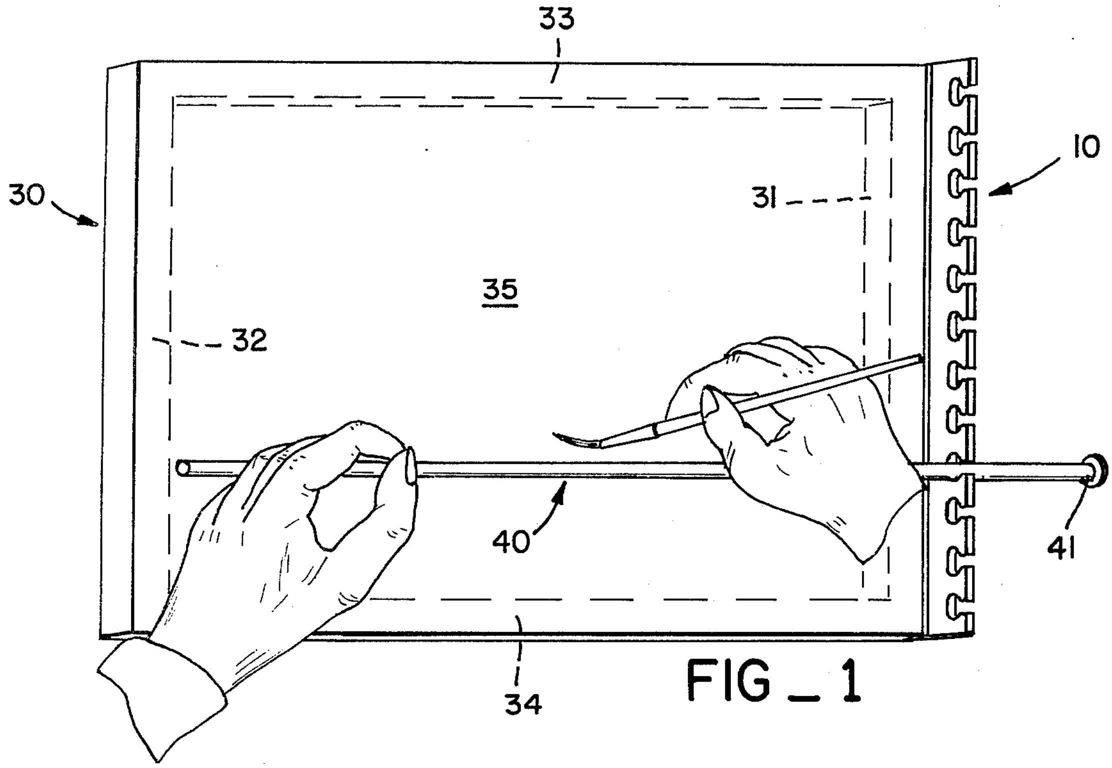
FIG. 1 is a perspective view of a preferred embodiment of the mahl-stick holder in accordance with this invention in use with an artist's frame and mahl-stick.

Referring to FIG. 1, a mahl-stick holder 10 in accordance with a preferred embodiment of this invention is shown in use with an artist's frame 30 and mahl-stick 40 by a right-handed artist. The artist's frame is made up of two elongated side members 31, 32 interconnected at their opposite ends by elongated top and bottom members 33, 34 to form a hollow rectilinear configuration as indicated by the dotted lines.

A working surface 35 may be provided by stretching a canvas over the frame 30 and fastening it to the side, top and bottom member 31–34 for example. However, the working surface should also be provided by a cardboard or sheet of paper suitably mounted on the frame 30.

It will be understood that the above-described artist's frame is a conventional structure. It provides a firm support for the working surface and yet is light for ease in handling. A minimum of material is used in the frame and a completed or spoiled working surface may easily replaced by a new working surface.

Similarly, the mahl-stick 40 shown in FIG. 1, comprising an elongated round rod, is a conventional aid used by artists. The mahl-stick 40 may be provided with a button 41 or ball at one or both ends. In the prior art, the mahl-stick 40 was held toward one end thereof in the free hand of the artist (the left hand in FIG. 1) and the other end of the mahl-stick 40 is rested against a frame member 31 or the working surface 35 and the painting or drawing hand (the right hand in FIG. 1) of the artist is rested against the mahl-stick. In this way, the mahl-stick 40 can provide a bridge over wet paint on the working surface against which the hand of the artist may be steadied in applying paint of a different color to a contiguous area. Similarly, the operative hand of the artist may be rested against the mahl-stick in making long even strokes and straight lines or simply used to prevent the operative hand of the artist from contacting and smudging or smearing the working surface during detail work.

However, according to the prior art, the mahl-stick had to be firmly held by the free hand of the artist often for extended periods. Thus, there was a tendency for the mahl-stick to be unsteady or slip, particularly were the spacing between the hands of the artist along the mahl-stick become larger.

According to this invention, the mahl-stick holder 10 is provided which may be affixed to the frame 30 as desired. In FIG. 1, the mahl-stick holder 10 is shown affixed to the right side of the frame 30 for use by a right handed painter, however, it could also be affixed to the left side or to the top or bottom of the frame 30, as desired.

Figure 3:
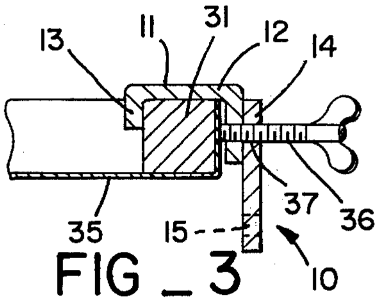
FIG. 3 is a cross-sectional view of the mahl-stick holder of FIG. 1 but showing it as mounted on the artist's frame.
Figure 2:
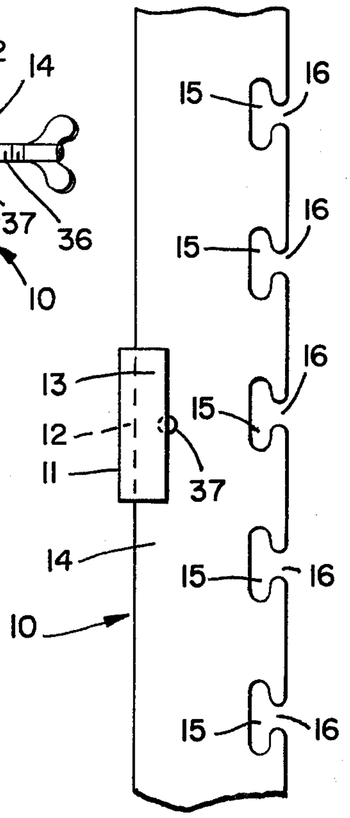
FIG. 2 is a side view of the mahl-stick holder of FIG. 1.

Referring to FIGS. 2 and 3, it will be seen that the mahl-stick holder 10 comprises a U-shaped member 11 having a bight 12 slightly larger than the width of the cross-section of the frame member 31. One leg 13 of the U-shaped member 11 has a length less than the height of the cross-section of the frame member 31 and the other leg 14 of the U-shaped member 11 has a length substantially greater than the height of the cross-section of the frame member 31.

The long leg 14 of the U-shaped member 11 is provided with an aperture 15 therethrough of larger cross-sectional dimensions than the cross-section of the mahl-stick 40 in order to receive the mahl-stick 40 therethrough. According to this invention, the aperture 15 should be sufficiently oversize with respect to the mahl-stick 40 to permit the axis of elongation of the mahl-stick to form an angle of at least 15° with respect to the axis of the aperture 15 in any direction in order to preserve the artist's freedom of expression.

Referring to FIGS. 1 and 2, in the preferred embodiment of this invention, the major surfaces of the leg 14 of the U-shaped member are elongated along the frame and provided with a plurality of apertures 15. The entire U-shaped member could, of course, be elongated as is the leg 14, however, such a structure would be heavier than necessary and wasteful of material. Thus, for ease of fabrication, the elongated leg 14 of the U-shaped member is preferably provided by making both legs and the bight of the U-shaped member of comparable size and rigidly affixing an elongated member to the leg 14 as best shown in FIGS. 2 and 3.

In this embodiment of the invention, each of the apertures 15 is also elongated into a slot-like configuration along the axis of elongation of the leg 14. Also, openings 16 are provided at the outer edge of the leg 14 each of which communicates with the different one of the plurality of slotlike apertures 15 centrally thereof. Such openings 16 facilitate the insertion and removal of the mahl-stick 40 in the apertures 15.

It will be understood that, in any given frame 30 the cross-sections of the side, top and bottom members 31–34 will tend to be identical to each other in terms of the width and height dimensions thereof, although such cross-sections may not be generally square as shown in FIG. 3 but could be rectangular or even round. In any event, the mahl-stick holder 10 may be mounted on any one of the side, top and bottom members 31-34 depending on the orientation of the frame 30 and the slot-like shape of the apertures 15 enables either right handed or left handed use thereof.

In the preferred embodiment of this invention, the mahl-stick is provided with a thumb screw 36 extending through a threaded aperture 37 in the leg 14 adjacent the bight 12 of the U-shaped member 11. Such thumb screw 36 enables the mahl-stick holder 10 to be quickly and solidly fixed to any one of the side, top and bottom members in any desired position. It will be understood that other clamping means could be used in place of the thumb screw 36. For example, the U-shaped member 11 could be made of spring stock and the legs 13, 14 thereof biased to compressively engage a frame member received in the U-shaped member therebetween. However, the use of thumb screw 36 is preferred because it enables the mahl-stick holder 10 to be readily adjusted in position in order to maintain the freedom of expression which the vertically oriented work surface provides to the artist.

Figure 4:
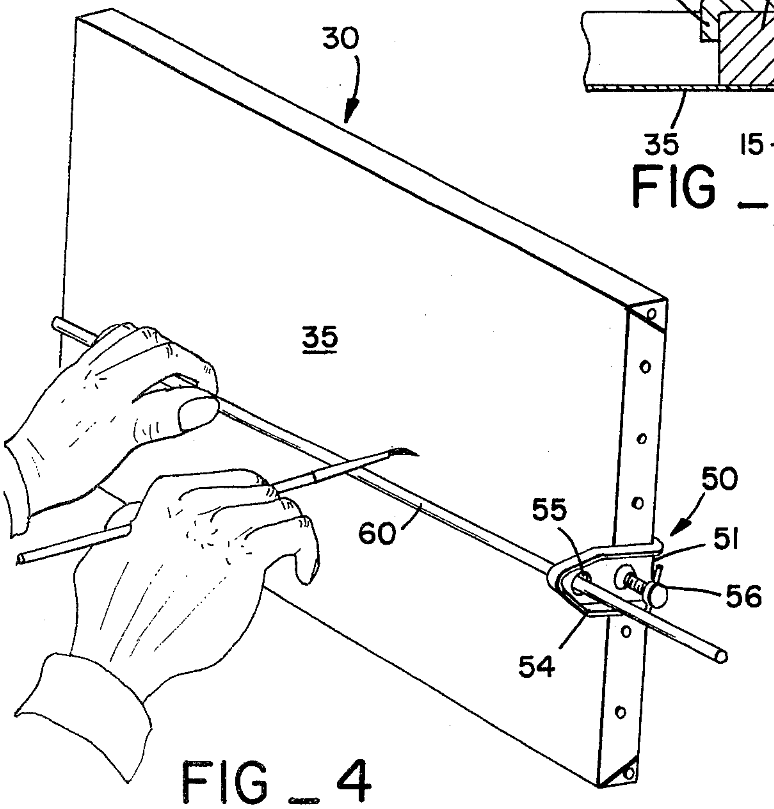
FIG. 4 is a perspective view of another embodiment of the mahl-stick holder in accordance with this invention in use with an artist's frame and mahl-stick.

Referring to FIG. 4, another embodiment of this invention is shown in which the mahl-stick holder 50 provides a single oversize aperture 55 for receiving a mahl-stick 60. Thus, the leg 54 is not elongated as in the embodiment of FIGS. 1–3 but instead, the U-shaped member 51 is a single integral body. The thumb screw 56 enables the U-shaped member to be quickly and easily adjusted in position along the side, top or bottom members of the frame 30 and this, coupled with the at least 30° of travel of the mahl-stick 60 permitted by the oversize aperture 55, preserves the artist's freedom of expression.

The mahl-stick holder according to this invention may be made of plated steel for long, corrosion-free life. Other materials such as aluminum or a suitable plastic could be used where the elongated side 14 of the embodiment of FIGS. 1-3 is desired in order to reduce the weight of the device. In addition, the bight portion of the mahl-stick holder according to this invention could be provided with a suction cup (not shown) or the like, to serve as a means for mounting the mahl-stick holder to a surface or structure immediately adjacent the frame or work surface.

What is claimed is:

1. In combination with an artist's working surface and a mahl-stick of given cross-sectional dimensions; a mahl-stick holder comprising a U-shaped member having a bight portion and one leg shorter than the other leg, an aperture through said other leg at the free end thereof having cross-sectional dimensions larger than said given cross-sectional dimensions of said mahl-stick, and means associated with said bight portion and said legs of said U-shaped member for adjustably mounting said U-shaped member with said other leg thereof adjacent said working surface whereby said mahl-stick may be received through said aperture in said other leg for limited movement with respect to said working surface.

2. The combination as claimed in claim 1 wherein said cross-sectional dimensions of said aperture through said other leg of said U-shaped member are enough larger than said given cross-sectional dimensions of said mahl-stick to permit the axis of said mahl-stick to form an angle of at least 15° with respect to the axis of said aperture in any direction.

3. In combination with an artist's frame comprising two elongated side members interconnected at their opposite ends by elongated top and bottom members into a hollow rectilinear four sided configuration said side, top and bottom members having generally identical cross-sections of given width and height dimensions, a canvas member mounted over said hollow rectilinear configuration and affixed to said side, top and bottom members, and a mahl-stick for guiding the hand of the artist in applying paint and the like to the surface of said canvas member; a mahl-stick holder comprising a U-shaped member having a bight slightly larger than said given width dimension of said cross-section of said side, top and bottom members, one leg of said U-shaped member having a length less than said given height dimension of said cross-section of said side, top and bottom members, the other leg of said U-shaped member having a length substantially greater than said height dimension of said cross-section of said side, top and bottom members, said other leg of said U-shaped member having an aperture therethrough which aperture has cross-sectional dimensions larger than the cross-sectional dimensions of said mahl-stick and which aperture is spaced from the bight of said U-shaped member by a distance greater than the height dimension of said cross-section of said side, top and bottom members, and means associated with said legs and bight of said U-shaped member for removably clamping said U-shaped member to one of said side, top and bottom members of said frame with said one leg thereof within said frame and said other leg thereof projecting beyond said working surface on the outside of said frame.

4. The combination claimed in claim 3 wherein said means for removably clamping said U-shaped member to one of said side, top and bottom members comprises a thumb screw received in a threaded aperture through a leg of said U-shaped member adjacent said bight of said U-shaped member.

5. The combination claimed in claim 3 wherein said other leg of said U-shaped member extends a substantial distance along said one of said side, top and bottom members to which said U-shaped member is attached and is provided with a plurality of apertures spaced from each other along the free end thereof each of which has cross-sectional dimensions larger than said given cross-sectional dimensions of said mahl-stick.

6. The combination claimed in claim 5 wherein each of said plurality of apertures is a slot elongated in the direction of the extent of said other leg along said one of said side, top and bottom members to which said U-shaped member is attached, and each of said plurality of apertures communicates centrally thereof with a different opening to the free end of said other leg of said U-shaped member.

7. The combination claimed in claim 3 wherein said cross-sectional dimensions of said aperture through said other leg of said U-shaped member are enough larger than said given cross-sectional dimensions of said mahl-stick to permit the axis of said mahl-stick to form an angle of at least 15° with respect to the axis of said aperture in any direction.

8. The combination as claimed in claim 6 wherein said other leg of said U-shaped member includes a first portion integral with said bight and said one leg of said U-shaped member and a second elongated portion rigidly affixed to said first portion, said plurality of apertures being provided in said second portion of said other leg of said U-shaped member.

* * * * *